May 8, 1962 R. A. D'AMATO ET AL 3,033,742
APPARATUS FOR THE MANUFACTURE OF LAMINATED CORNER PIECES
Original Filed July 25, 1956
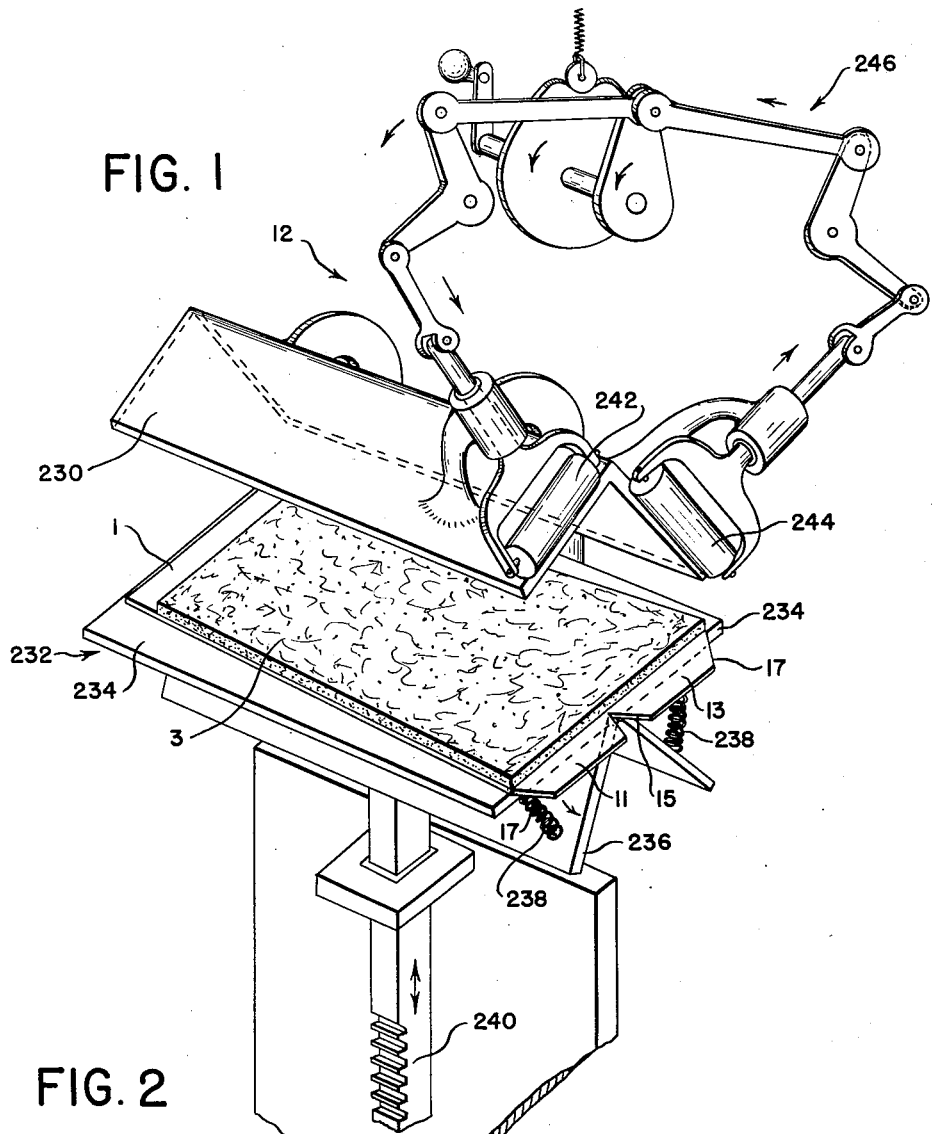
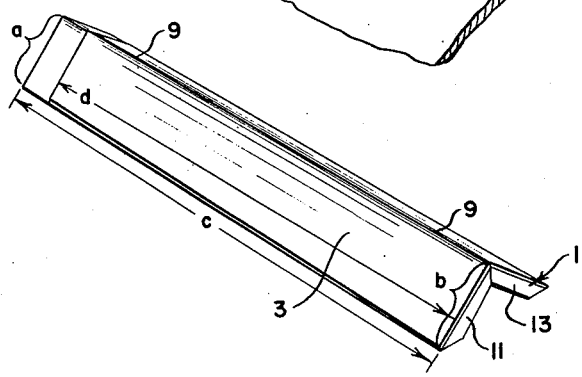
INVENTORS
RAPHAEL A. D'AMATO
ROY E. REHM
BY
ATTORNEYS United States Patent Office 3,033,742
Patented May 8, 1962

3,033,742
APPARATUS FOR THE MANUFACTURE OF LAMINATED CORNER PIECES
Raphael A. D'Amato, East Rutherford, and Roy E. Rehm, Little Ferry, N.J., assignors to Raphael A. D'Amato, doing business as Industrial Service Company, East Rutherford, N.J., a sole proprietorship
Original application July 25, 1956, Ser. No. 599,991. Divided and this application Aug. 25, 1959, Ser. No. 840,219
2 Claims. (Cl. 156—585)

This invention relates to the manufacture of building materials, and more particularly to a method and means for forming corner- or bridge pieces for use with insulated siding in the exterior finish of buildings, and to the cornerpieces so produced. This application is a division of our application Serial No. 599,991, filed July 25, 1956, which became abandoned August 24, 1960.

A widely accepted material for the exterior finish of residential and other buildings known as insulated siding comprises a stiff backing of asphalt impregnated fibrous or cellulosic material covered with a finish layer of asphalt mixed with very finely crushed rock, into the surface of which layer is rolled a coating of slate granules. This material is commonly provided in boards of substantial size, for example 14 by 43 inches approximately, and these boards are applied as an exterior finish to the side of the building, commonly with an overlap between the successive courses in the same manner as wood siding or clapboards. At the corners of the building the ends of the boards are, as first applied, exposed, and the invention is concerned with the provision of cornerpieces to conceal the ends of the siding so exposed. Since the siding is frequently provided with a pattern in its exterior surface, for example in the form of striations in the color of the slate granules or in the form of surface indentations imitative of the grain of wood, it is important for satisfactory appearance of the finished building that the cornerpieces possess the same finish as the siding boards which they are to complete.

The invention provides a method and apparatus for the manufacture of such cornerpieces. According to the invention a cornerpiece is manufactured from a piece of the same finish layer as the siding itself, shaped to fit the space at the corner of a building between two siding members and supported on a similarly shaped backing sheet of metal such as aluminum. In accordance with the invention the finish layer employed is stripped from siding boards of the same lot as those with which the cornerpieces are to be used. The stripped finish layer is cut into strips of desired size and shape which are then coated with an adhesive and applied to metal backing sheets, and the resulting laminated structure is shaped into the form of the desired cornerpiece.

The invention will now be described in greater detail with reference to the accompanying drawings in which:

FIG. 1 is a perspective view of a machine according to the invention for shaping the bonded finish layer and backing strips into cornerpieces according to the invention;

FIG. 2 is a perspective view of a cornerpiece according to the invention.

Flat bonded backing plate and finish layer units are shaped into finished cornerpieces by means of the apparatus of the present invention. Such units may be prepared by means of the apparatus disclosed and claimed in my co-pending applications Serial Nos. 840,217 and 840,218, filed concurrently with the present application and also constituting divisions of my application Serial No. 599,991. This shaping is performed on the press of FIG. 1. In this press there is provided a fixed female die 230 having two plane surfaces intersecting at right angles or slightly less in view of the elasticity of the materials to be treated. A vertically reciprocable table generally indicated at 232 is arranged beneath the die 230. Table 232 includes a male die 236 having two plane surfaces inclined at the same angle as the plane surfaces of the female die. The table further includes a pair of leaves 234 hinged along the line of intersection of the plane surfaces of die 236. When the die halves are separated as shown in FIG. 1 the leaves 234 are supported in parallel horizontal position by springs 238 so that the unfinished cornerpieces can be laid on the plane surface formed by these leaves, with the tabs 11 and 13 of plate 1 extending beyond the short edges of the leaves. Table 232 is then lifted by suitable means engaging a rack 240 affixed to the table to bring the die halves together. While the die halves are closed, two rollers 242 and 244 are successively actuated, as by means of a crank and bell crank linkage generally indicated at 246, in order to bend over the tabs 11 and 13 to form a finished cornerpiece as indicated in FIG. 2. To permit bending of the flat, bonded combination of strips 1 and 3 shown in FIG. 1 into the generally dihedral shape of FIG. 2 consistently with the provision of the bent tabs 11 and 2, the plates 1 are notched as indicated at 15 in FIG. 1, to a depth equal to the width of the tabs 11 and 13 at the midpoint of one of the short sides of the metallic strips. This will be the longer of the two trapezoidal bases in the case of cornerpieces such as those illustrated in FIG. 2 which taper toward their upper ends. The extremes of the base notched at 15 may further be cut off along diagonal lines as indicated at 17 in FIG. 1.

While the invention has been described herein in terms of a preferred form of cornerpiece and in terms of a preferred method and apparatus for the manufacture thereof, various changes may be made in the various aspects of the invention as thus described without departing from the invention itself which is defined in the appended claims. The matching laminated finish material of the invention may of course be employed in the form of cornerpieces which are not of trapezoidal shape before they are bent into dihedrals for closing the space between siding boards at the external corners of a building, and it is not necessary that the dihedral shape be of 90°. Indeed the construction material of the invention comprising a metallic backing plate to which is bonded the finish layer from insulated siding boards may be employed in flat form, for example to bridge a junction between insulated siding boards elsewhere than at a corner junction.

We claim:

1. In the manufacture of laminated cornerpieces for closing the junction between siding boards at an external corner of the building, a forming machine comprising a female die of dihedral shape, a male die of dihedral shape, leaves on said male die resiliently supported in a common plane, means to bring said dies together, and separate rollers each affixed to said female die and movable past an edge thereof.

2. In the manufacture of laminated cornerpieces for closing the junction between siding boards at an external corner of the building, a forming machine comprising a female die of dihedral shape, a male die of dihedral shape, leaves on said male die resiliently supported in a common plane, means to bring said dies together, and means to fold successively end portions of a laminar workpiece protruding from the two half planes defined by the space between said dies when closed.

References Cited in the file of this patent
UNITED STATES PATENTS
2,319,211     Cluett et al. _____ May 18, 1943